United States Patent
Benakli et al.

(10) Patent No.: US 8,902,548 B2
(45) Date of Patent: Dec. 2, 2014

(54) HEAD WITH HIGH READBACK RESOLUTION

(75) Inventors: Mourad Benakli, Bloomington, MN (US); Kirill Aleksandrovich Rivkin, Edina, MN (US); Declan Macken, Prior Lake, MN (US); Victor Boris Sapozhnikov, Minnetonka, MN (US)

(73) Assignee: Seagate Technology LLC, Cupertino, CA (US)

( * ) Notice: Subject to any disclaimer, the term of this patent is extended or adjusted under 35 U.S.C. 154(b) by 327 days.

(21) Appl. No.: 12/771,528

(22) Filed: Apr. 30, 2010

(65) Prior Publication Data

US 2011/0268991 A1    Nov. 3, 2011

(51) Int. Cl.
*G11B 5/39*    (2006.01)
*G11B 5/115*    (2006.01)

(52) U.S. Cl.
CPC .............. *G11B 5/3912* (2013.01); *G11B 5/115* (2013.01)
USPC ........................................................ 360/319

(58) Field of Classification Search
USPC ........................................................ 360/319
See application file for complete search history.

(56) References Cited

U.S. PATENT DOCUMENTS

| | | | |
|---|---|---|---|
| 5,208,715 A * | 5/1993 | Mowry | 360/319 |
| 5,750,270 A | 5/1998 | Tang et al. | |
| 6,087,027 A | 7/2000 | Hoshiya et al. | |
| 6,128,160 A | 10/2000 | Yamamoto | |
| 6,342,993 B1 * | 1/2002 | Sato | 360/319 |
| 6,462,897 B1 | 10/2002 | Yamamoto | |
| 6,477,018 B1 | 11/2002 | Terunuma | |
| 6,500,570 B2 | 12/2002 | Hasegawa et al. | |
| 6,525,911 B1 * | 2/2003 | Gill | 360/319 |
| 6,775,108 B2 | 8/2004 | Kief et al. | |
| 6,894,878 B1 | 5/2005 | Cross | |
| 6,936,353 B1 | 8/2005 | Wu et al. | |
| 7,019,944 B2 * | 3/2006 | Matono et al. | 360/125.2 |
| 7,196,871 B2 | 3/2007 | Hsu et al. | |
| 7,282,278 B1 | 10/2007 | Nolan | |
| 7,295,401 B2 * | 11/2007 | Jayasekara et al. | 360/125.08 |
| 7,314,675 B1 | 1/2008 | Nolan | |
| 7,379,277 B2 | 5/2008 | Burbank et al. | |

(Continued)

FOREIGN PATENT DOCUMENTS

| | | | |
|---|---|---|---|
| JO | 2005190515 | 7/2005 | |
| JP | 11328632 A * | 11/1999 | G11B 5/39 |
| JP | 2002298314 | 10/2002 | |

OTHER PUBLICATIONS

Shute, Hazel A. et al.: "Analytic Three-Dimensional Response Function of a Double-Shielded Magnetoresistive or Giant Magnetoresistive Perpendicular Head", IEEE Transactions on magnetics, vol. 42, No. 5, May 2006 (9 pages).

(Continued)

*Primary Examiner* — Julie Anne Watko
(74) *Attorney, Agent, or Firm* — Westman, Champlin & Koehler, P.A.

(57) ABSTRACT

An apparatus that includes a first read shield and a second read shield and a reader stack between the first and second read shields. The first and second read shields each include a thin high permeability layer closest to the reader stack and a low permeability layer and/or a geometric feature to control magnetic field flux lines in a free layer of the reader stack.

21 Claims, 7 Drawing Sheets

(56) References Cited

U.S. PATENT DOCUMENTS

| | | |
|---|---|---|
| 7,408,742 B2 | 8/2008 | Kameyama |
| 7,408,746 B2 | 8/2008 | Sato |
| 7,440,230 B2 | 10/2008 | Hsu et al. |
| 7,468,214 B2 | 12/2008 | Lu et al. |
| 7,556,871 B2 | 7/2009 | Ichihara et al. |
| 7,808,742 B2 * | 10/2010 | Kamijima et al. ....... 360/125.02 |
| 7,881,019 B2 * | 2/2011 | Hsiao et al. ................... 360/319 |
| 2002/0167768 A1 * | 11/2002 | Fontana et al. ............ 360/324.2 |
| 2004/0117976 A1 | 6/2004 | Sato et al. ................... 29/603.04 |
| 2005/0141142 A1 * | 6/2005 | Mochizuki et al. ........... 360/319 |
| 2005/0264948 A1 * | 12/2005 | Nakamoto et al. ........... 360/319 |
| 2006/0067006 A1 * | 3/2006 | Takagishi et al. ............ 360/319 |
| 2006/0203395 A1 * | 9/2006 | Guan et al. ................... 360/319 |
| 2006/0245113 A1 * | 11/2006 | Guan et al. ................... 360/319 |
| 2007/0009766 A1 | 1/2007 | Lu et al. |
| 2007/0127165 A1 | 6/2007 | Kanaya et al. |
| 2007/0146930 A1 | 6/2007 | Hsu et al. |
| 2007/0242392 A1 * | 10/2007 | Benakli ........................ 360/319 |
| 2008/0003354 A1 | 1/2008 | Nolan |
| 2008/0068760 A1 | 3/2008 | Suk |
| 2008/0094059 A1 | 4/2008 | Sasaki et al. |
| 2008/0180858 A1 | 7/2008 | Ota et al. |
| 2008/0247087 A1 | 10/2008 | Otani et al. |
| 2009/0188891 A1 | 7/2009 | Tanaka et al. |
| 2009/0197121 A1 | 8/2009 | Inturi et al. |
| 2009/0207534 A1 * | 8/2009 | Miyauchi et al. ........ 360/324.11 |
| 2009/0262464 A1 * | 10/2009 | Gill et al. ..................... 360/319 |
| 2011/0292545 A1 * | 12/2011 | Katada et al. ............ 360/123.12 |

OTHER PUBLICATIONS

Shute, Hazel A. et al.: "A Theoretical Analysis of Shielded Magnetoresistive Heads by Conformal Mapping", IEEE Transactions on Magnetics, vol. 33, No. 1, Jan. 1997 (11 pages).

U.S. Appl. No. 12/771,490, filed Apr. 30, 2010.

Japanese Office Action from Japanese Patent Application No. 2011-101204 dated Nov. 13, 2012.

* cited by examiner

HEAD WITH HIGH READBACK RESOLUTION

BACKGROUND

In a magnetic data storage and retrieval system, a magnetic recording head typically includes a reader portion, or read head, having a magnetoresistive (MR) sensor for retrieving magnetically encoded information stored on a magnetic medium, such as a magnetic disc. To help ensure that the MR sensor reads only the information that is stored directly beneath it on a specific track of the magnetic disc, magnetic shields are placed on the read head.

As an ever-increasing amount of information is stored on a magnetic medium, it becomes difficult for MR sensors to separately read the stored information without also reading noise from adjacent stored information. Thus, as areal densities increase, there has to be a corresponding increase in sensitivity and resolution of the MR sensors.

The present embodiments address these problems and offer other advantages over the prior art.

SUMMARY

In one embodiment, an apparatus that includes a first read shield and a second read shield and a reader stack between the first and second read shields is provided. In this embodiment, the first and second read shields each include a thin high permeability layer closest to the reader stack and a low permeability layer to control magnetic field flux lines in a free layer of the reader stack.

In another embodiment, an apparatus that includes a first read shield and a second read shield and a reader stack between the first and second read shields is provided. In this embodiment, the first and second read shields each include a geometric feature at an air bearing surface to control magnetic field flux lines in a free layer of the reader stack.

In still another embodiment, an apparatus that includes a first read shield and a second read shield and a reader stack between the first and second read shields is provided. In this embodiment, the first and second read shields each comprise a thin high permeability layer closest to the reader stack and a low permeability layer, the first and second read shields each further comprise a geometric feature at an air bearing surface.

These and various other features and advantages will become apparent upon reading the following detailed description and upon reviewing the associated drawings.

DETAILED DESCRIPTION

Figure 1:
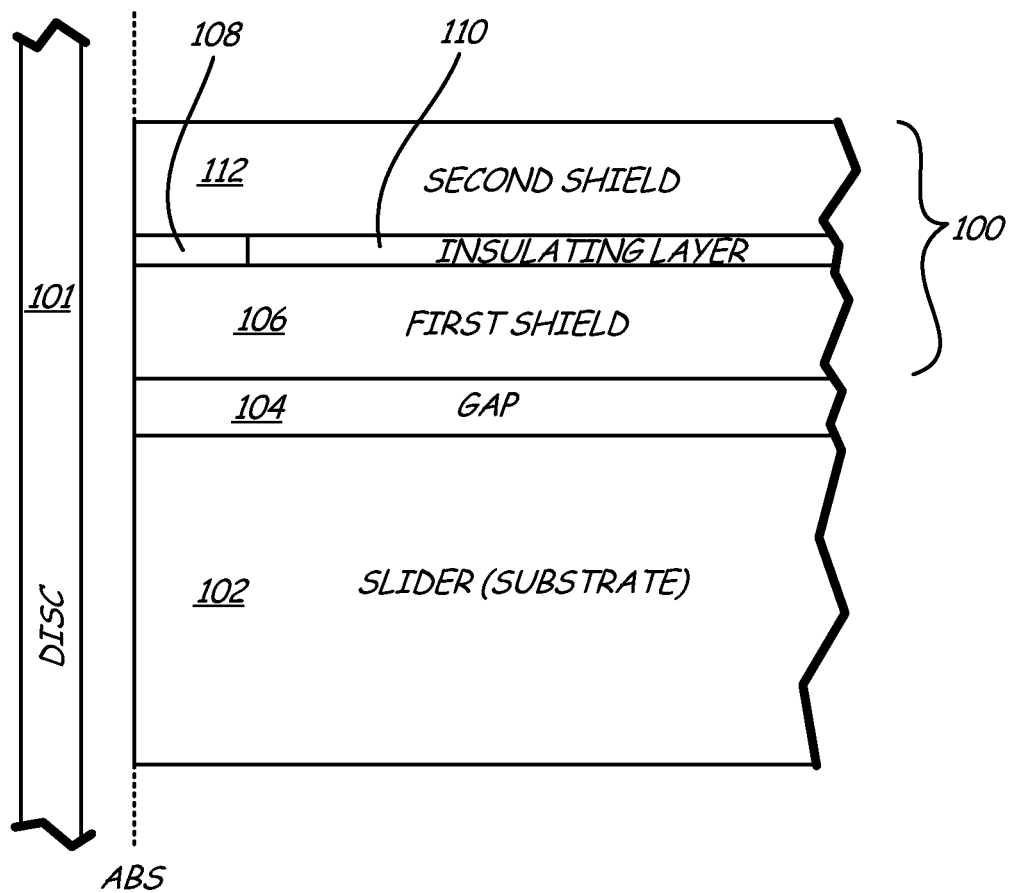
FIG. 1 is a cross-sectional view of magnetic read head and magnetic disc taken along a plane substantially normal to a pane of an air bearing surface (ABS) of the magnetic read head.

FIG. 1 is a cross-sectional view of magnetic read head 100 and magnetic disc 101 taken along a plane substantially normal to a plane of an air bearing surface (ABS) of magnetic read head 100. As will be described further below, the present embodiments are useful in a magnetic read head such as 100. Magnetic disc 101 may be either a perpendicular or longitudinal recording media, with magnetic read head 100 corresponding thereto. Magnetic read head 100 is carried on slider body (substrate) 102 and separated therefrom by gap 104. Magnetic read head 100 includes first magnetic shield 106, magnetoresistive (MR) sensor 108, insulating layers 110, and second magnetic shield 112. MR sensor 108 and insulating layers 110 are positioned between bottom and top shields 106 and 112, with MR sensor 108 being adjacent the ABS of magnetic head 100.

In the embodiment of FIG. 1, to provide current to MR sensor 108, first and second magnetic shields 106 and 112 perform double duty as both magnetic shields and electrodes. Thus, first and second magnetic shields 106 and 112 serve the dual functions of providing electrical connection to MR sensor 108 and providing magnetic shielding from stray magnetic fields. As will be described below in connection with FIG. 2, in the embodiment of FIG. 1, a sense current flows in a direction perpendicular to the plane of read element 108.

Figure 2:
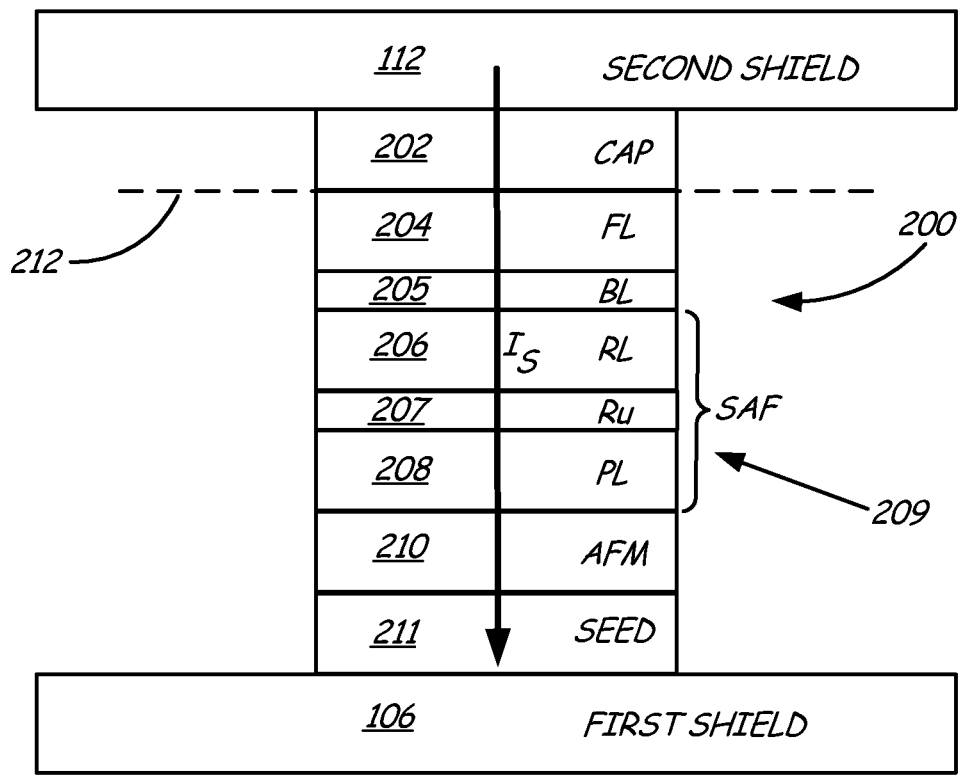
FIG. 2 shows an ABS view of a magnetoresistive (MR) sensor having a MR stack.

FIG. 2 shows an ABS view of a MR sensor comprising MR stack 200, which is a specific embodiment of MR sensor 108. MR stack 200 includes metal cap layer 202, free layer (FL) 204, a barrier layer (BL) 205, a synthetic antiferromagnetic (SAF) layer 209, an antiferromagnetic (AFM) pinning layer 210 and a seed layer 211. SAF layer 209 includes a reference layer 206 and a pinned layer (PL) 208, separated by a layer 207 of ruthenium (Ru), or the like. MR stack 200 is positioned between first shield 106 and second shield 112.

In operation, sense current $I_S$ is passed through current-perpendicular-to-plane (CPP) MR stack 200. Sense current $I_S$ flows perpendicularly to the plane of the layers of the MR read sensor and experiences a resistance which is proportional to the cosine of an angle formed between the magnetization directions of the free layer. The voltage across the CPP MR stack is then measured to determine the change in resistance and the resulting signal is used to recover the encoded information from the magnetic medium. It should be noted that CPP MR stack configuration 200 is merely illustrative, and other layer configurations for CPP MR stack 200 may be used. Dashed line 212 represents a plane between layers of MR stack 200.

It should be noted that the present embodiments are also useful for current-in-plane (CIP) read heads (not shown) in which the sense current flows in a plane of the read sensor. CIP read heads usually include additional metal contact layers, spacer layers, etc., between the read sensor and the read shields.

As noted earlier, there is a need to improve readback resolution of heads. Readback resolution, which is a "channel metric" for bits per inch (BPI) capabilities, is a often measured in terms of PW50, which can be defined as a width of a differentiated readback signal of an isolated media transition measured at half-height pulse width. The lower the PW50 value the higher the readback resolution. Historically, PW50 reduction was enabled by a reduction of read head-media spacing and/or a reduction of reader shield-to-shield spacing.

Embodiments described further below propose to reduce PW50 by controlling field flux lines in a vicinity of a read sensor by a suitable choice of magnetic properties of the read shields, or suitable geometrical changes to the read shields. Prior to describing such embodiments, a conventional magnetic read head is described below in connection with FIG. 3.

Figure 3:
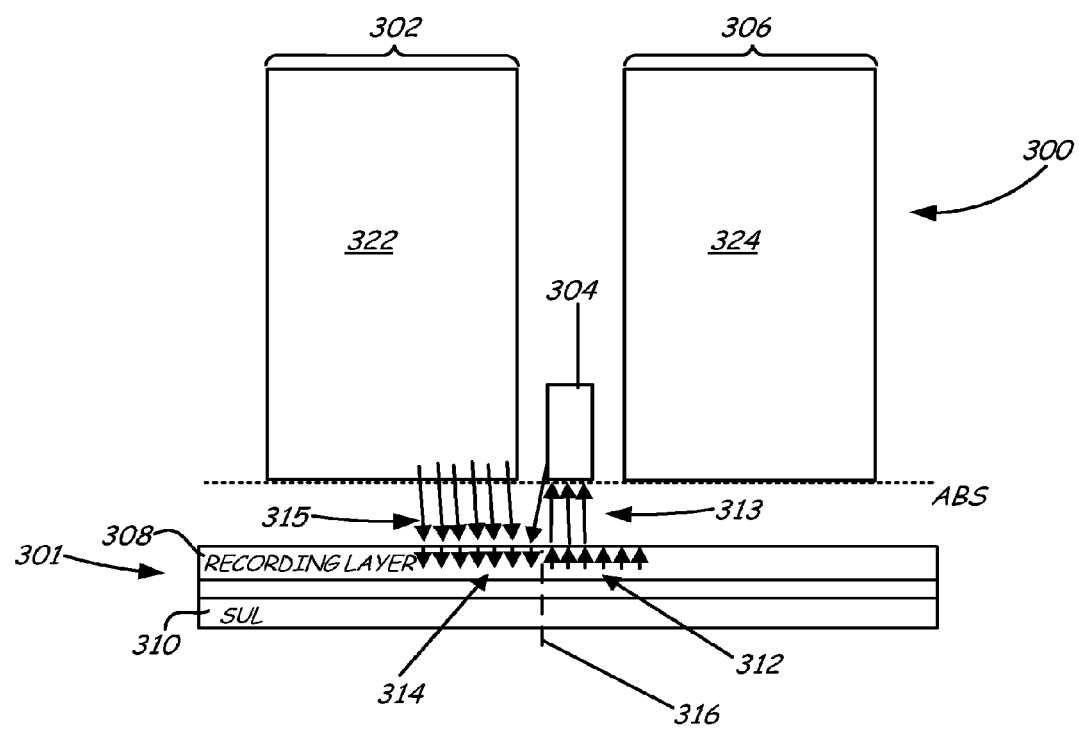
FIG. 3 is a cross-sectional view of a magnetic read head.

FIG. 3 is a cross-sectional view of a conventional magnetic read head 300 and magnetic disc 301 taken along a plane substantially normal to a plane of an ABS of magnetic read head 300. Read head 300 includes a first read shield 302, a read sensor 304 and a second read shield 306. As can be seen in FIG. 3, disc 301 includes a recording layer 308 and a soft under layer (SUL) 310. First and second magnetized regions 312 and 314, respectively, are shown on recording layer 308. Magnetization in regions 312 and 314 represents stored information. As can be seen in FIG. 3, a direction of magnetization in region 312 is substantially opposite to a direction of magnetization in region 314. Dashed line 316 marks a transition in the magnetization direction from region 312 to region 314. To better illustrate flux lines in read head 300, shields 302 and 306 are shown spaced apart from read sensor 304. In FIG. 3, upwardly directed flux lines 313 and downwardly directed flux lines 315 are shown. In conventional magnetic read heads such as 300, there is substantially no variation in permeability amongst different regions of the read shields and 302 and 306. In such read heads, when a read sensor such as 304 is above a region such as 312 as shown in FIG. 3, in addition to flux line 313 interacting with read sensor 304, read sensor 304 interacts with a portion of flux lines 315 from an adjacent magnetized region such as 314, which is undesirable. Reasons for such undesirable interaction and embodiments that address this problem are described below in connection with FIGS. 4 through 7b.

Figure 4:
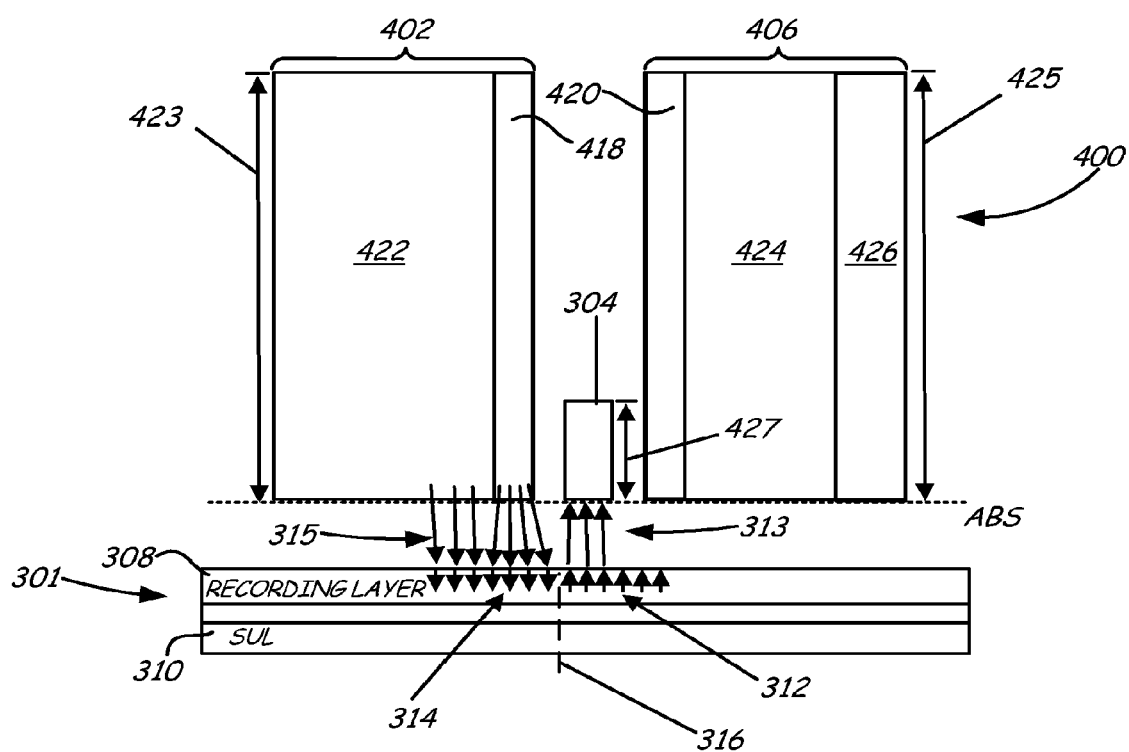
FIG. 4 is a cross-sectional view of a magnetic read head in accordance with one embodiment.

FIG. 4 is a cross-sectional view of magnetic read head 400 and magnetic disc 301 taken along a plane substantially normal to an ABS of magnetic read head 400. Read head 400 includes a first read shield 402, a read sensor 304 and a second read shield 406. In the embodiment of FIG. 4, first read shield 402 and second read shield 406 each include a thin relatively high permeability layer 418, 420 closest to reader stack or read sensor 304 and a relatively low permeability layer 422, 424 to control magnetic field flux lines in a free layer (not shown in FIG. 4) of reader stack 304. Flux closes in a highest permeability region available and therefore flux lines 315 that are near read sensor 304 close in thin high permeability layer 418 without interacting with sensor 304. Thus, only flux lines 313 reach read sensor 304, thereby avoiding noise from adjacent stored information. In some embodiments, a depth 423 to which the thin high permeability layer 418 in the first read shield 402 extends from the ABS and a depth 425 to which the thin high permeability layer 420 in the second read shield extends from the ABS are each substantially greater than a depth 427 to which the reader stack 304 extends from the ABS.

In some embodiments, at least one of the shields 402 and 406 can further include a second high permeability layer 426. In some embodiments, thin high permeability layer 418, 420 closest to the reader stack 304 is formed of a material having a high saturation moment and low magnetostriction under tensile strength. In one embodiment, thin high permeability layer 418, 420 includes an alloy of Cobalt (Co), Nickel (Ni) and Iron (Fe). The alloy of Co, Ni and Fe can include between 70 and 80 percent by weight Co, between 8 and 18 percent by weight Ni and between 7 and 17 percent by weight Fe. In a specific embodiment, the alloy of Co, Ni and Fe comprises 75 percent by weight Co, 13 percent by weight Ni and 12 percent by weight Fe. In some embodiments, a thickness of thin high permeability layer 418, 420 closest to the reader stack is about 40 nanometers (nm). In some embodiments, low permeability layer 422, 424 can be between 150 and 500 nm thick. In some embodiments, low permeability layer 422, 424 may be formed of an alloy of Co, Niobium (Nb) and Hafnium (Hf). In other embodiments, low permeability layer 422, 424 may be formed of an alloy of Co, Fe and Holmium (Ho). In some embodiments, a thickness of second high permeability layer 326 is between 10 to 60 nm. Second high permeability layer 326 may be formed of a same material as thin high permeability layer 418, 420.

FIGS. 5a and 5b, 6a and 6b and 7a and 7b show embodiments that employ geometric changes to shields 402 and 406 to help enforce flux closure in regions of shields 402 and 406 that are closest to read sensor 304. In the interest of simplification, a disc or storage medium and magnetic field flux lines are not included in FIGS. 5a and 5b, 6a and 6b, and 7a and 7b. Also, in the interest of simplification, reference numerals used in FIGS. 3 and 4 are again used in FIGS. 5a and 5b, 6a and 6b, and 7a and 7b, for the same or similar elements. In each of FIGS. 5a, 5b, 6a, 6b and 7a and 7b first and second read shields 402 and 406 each include a geometric feature at an ABS to control magnetic field flux lines in a free layer of the reader stack. The geometric changes involve the elimination of a portion of low permeability shield layer 422, 424 at the ABS. The elimination of the portion of the low permeability layer 422, 424 is carried out proximate to the thin high permeability layer 418, 420 at the air bearing surface.

Figure 5A:
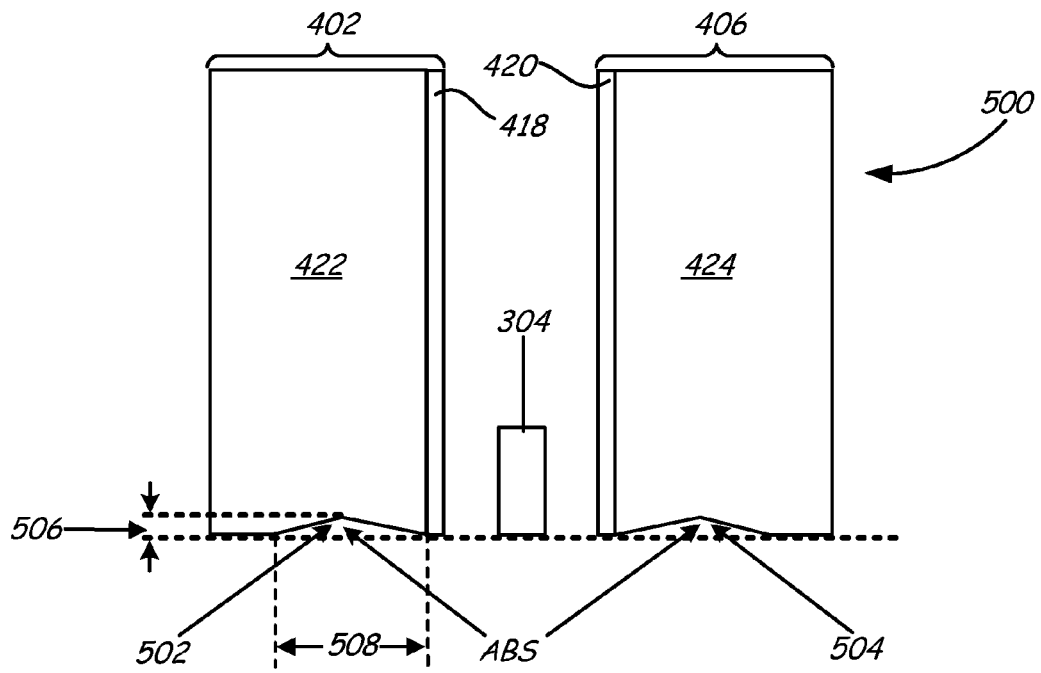
FIGS. 5a, 6a and 7a are cross-sectional views of different magnetic read heads taken along a plane substantially normal to a plane of an ABS of the magnetic read heads.
Figure 5B:
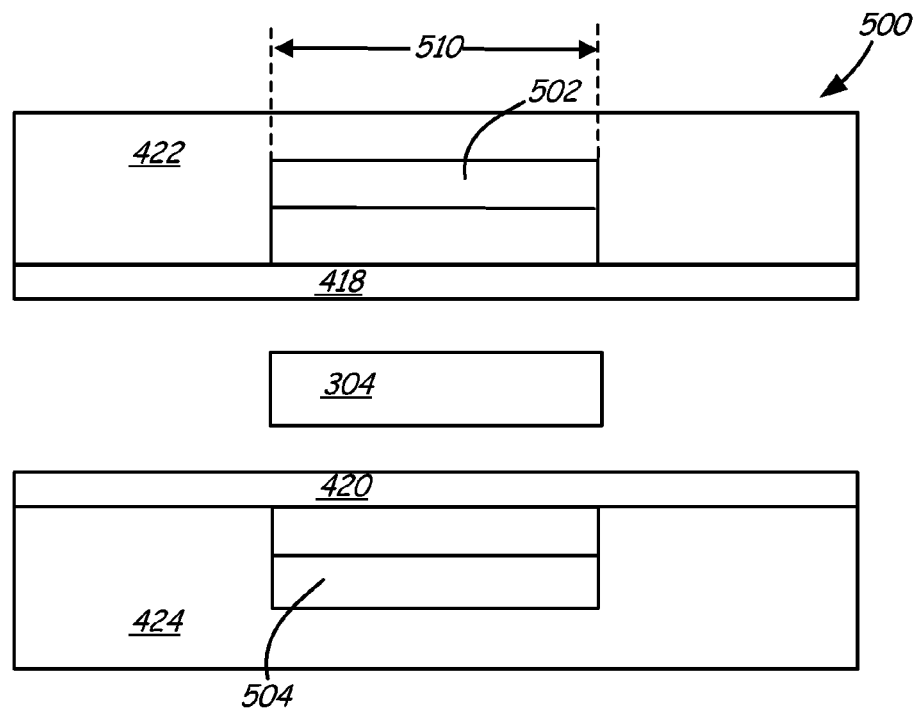
FIGS. 5b, 6b, and 7b show ABS views of the read heads of FIGS. 5a, 6a and 7a, respectively.

In FIGS. 5a and 5b, head 500 includes a notch 502, 504 as the geometric feature proximate to the read sensor 304. In the embodiment of FIGS. 5a and 5b, the notch 502, 504 is in low permeability shield layer 422, 424. A depth, width and length of the notch 502, 504 can vary in different embodiments. In some embodiments, a depth 506 of notch 502, 504 is between 5 nm and 40 nm, a width 508 of notch 502, 504 is between 20 nm and 200 nm and a length 510 of notch 502, 504 is between 30 nm and 1000 nm. In a particular embodiment, a depth 506 of notch 502, 504 is about 20 nm, a width 508 of notch 502, 504 is about 100 nm and a length 510 of notch 502, 504 is about 500 nm.

Figure 6A:
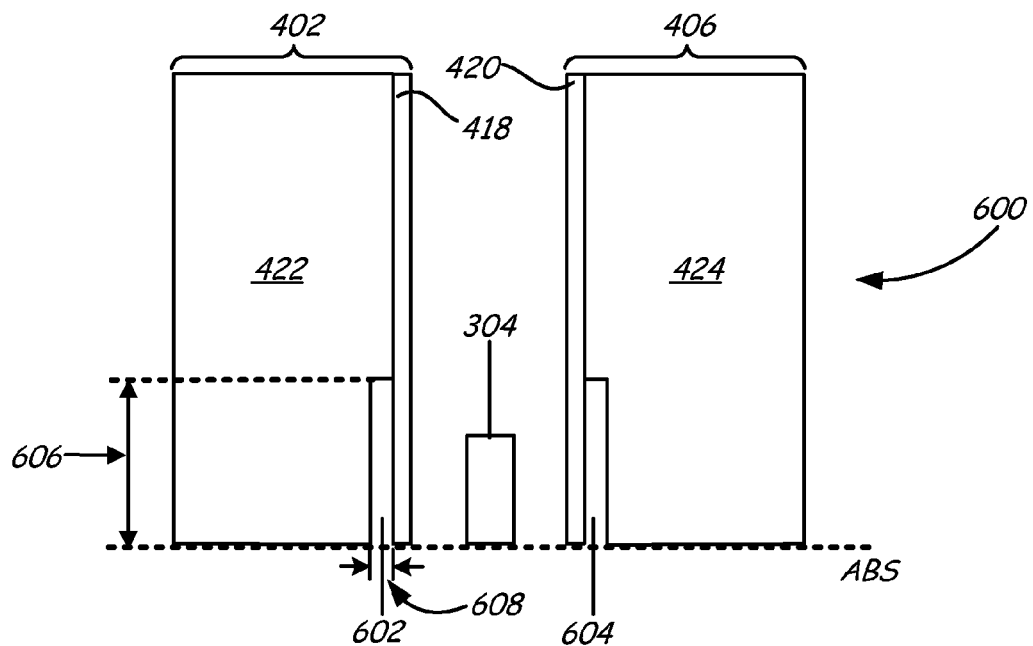
Figure 6B:
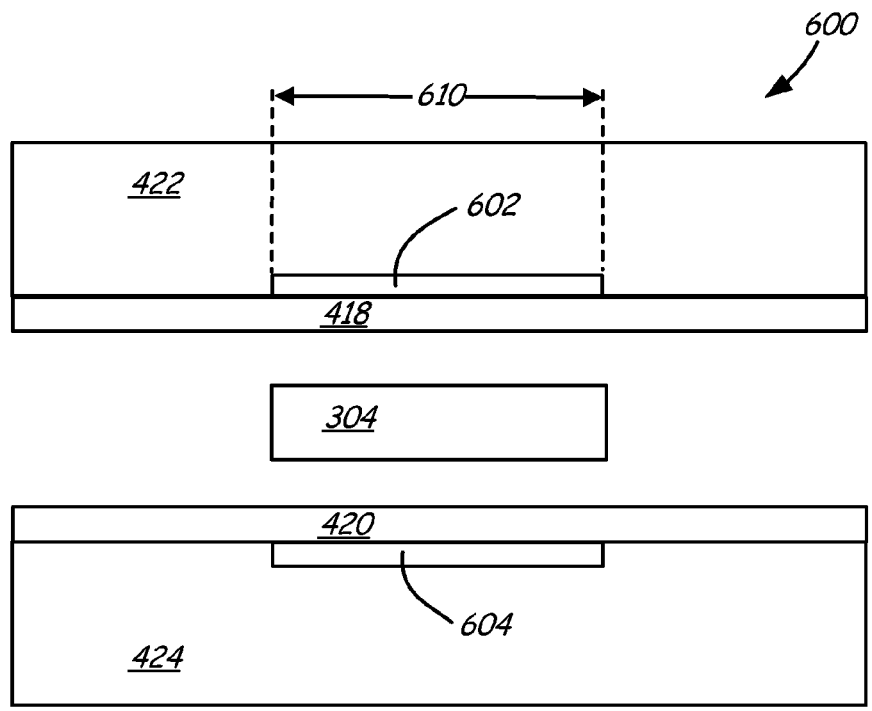

In FIGS. 6a and 6b, head 600 includes a partial gap 602, 604 as the geometric feature proximate to the read sensor 604. In the embodiment of FIGS. 6a and 6b, the partial gap 602, 604 is between high permeability layer 418, 420 and low permeability layer 422, 424 in each of the first and second read shields 402 and 406 at the air bearing surface. A depth, width and length of the partial gap 602, 604 can vary in different embodiments. In some embodiments, a depth 606 of partial gap 602, 604 is between 20 nm and 500 nm, a width 608 of partial gap 602, 604 is between 2 nm and 60 nm and a length 610 of partial gap 602, 604 is between 100 nm and 1000 nm. In a particular embodiment, a depth 606 of partial gap 602, 604 is about 100 nm, a width 608 of partial gap 602, 604 is about 20 nm and a length 610 of notch partial gap 602, 604 is about 500 nm.

Figure 7A:
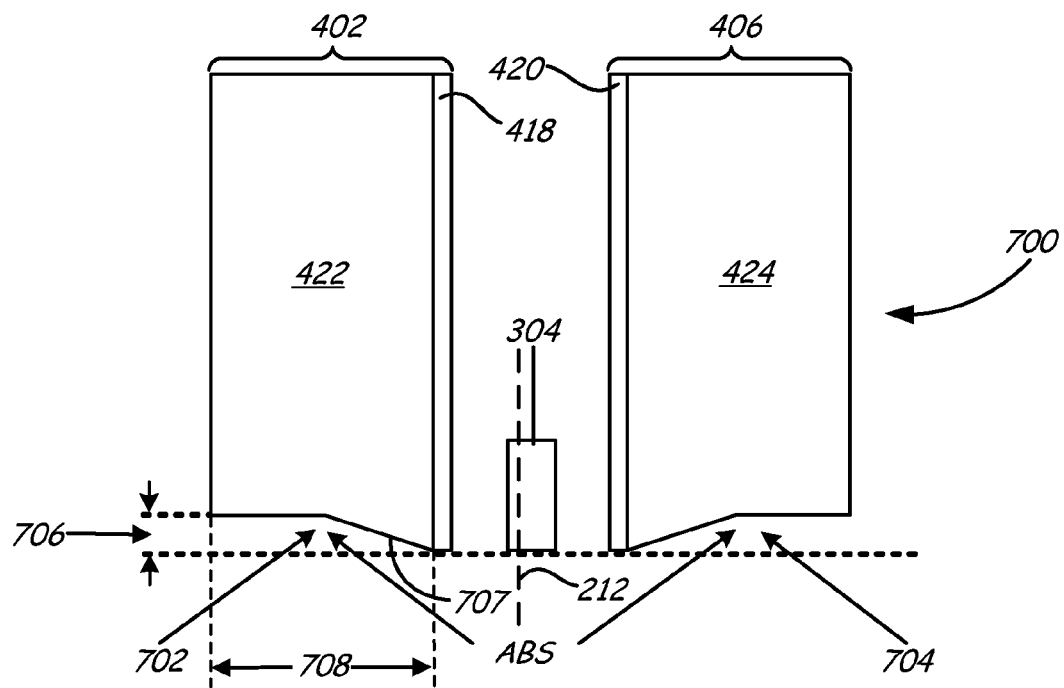
Figure 7B:
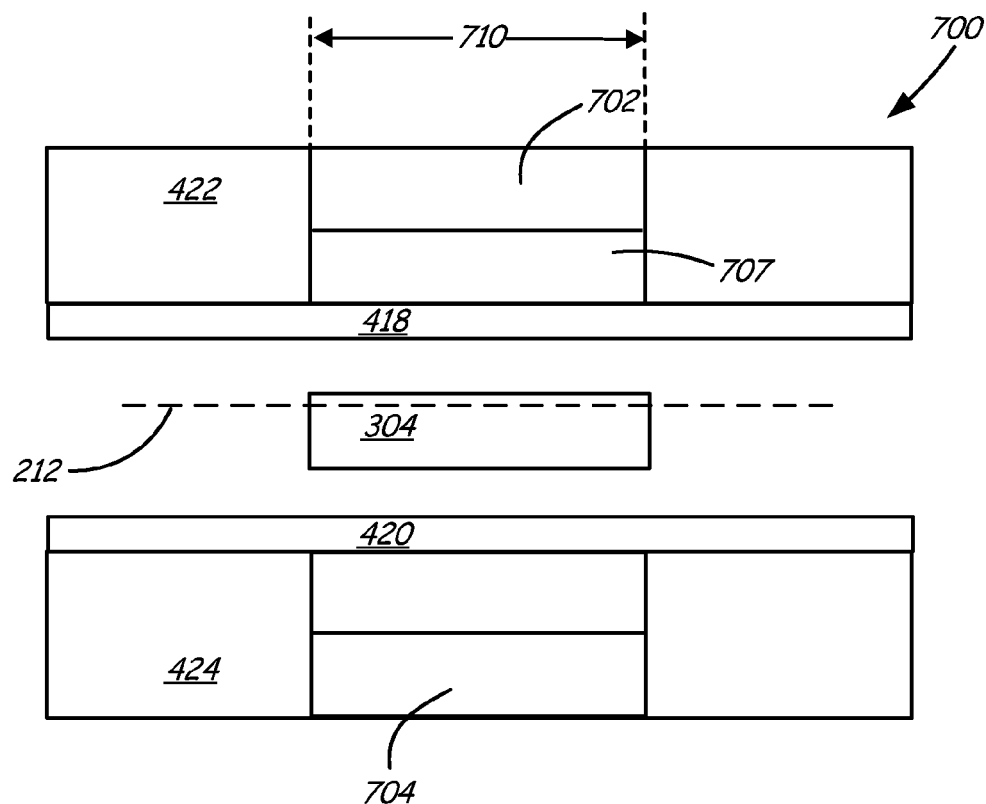

In FIGS. 7a and 7b, head 700 includes a recess 702, 704 as the geometric feature proximate to the read sensor 304. In the embodiment of FIGS. 7a and 7b, the recess 702, 704 is in low permeability shield layer 422, 424. A depth, width and length of the recess 702, 704 can vary in different embodiments. In some embodiments, a depth 706 of recess 702, 704 is between 5 nm and 50 nm, a width 708 of recess 702, 704 is between 200 nm and 1000 nm and a length 710 of recess 702, 704 is between 200 nm and 1000 nm. In a particular embodiment, a depth 706 of recess 702, 704 is about 20 nm, a width 708 of recess 702, 704 is about 500 nm and a length 710 of recess 702, 704 is about 500 nm. Geometric feature 702 includes a sloping surface 707. Dashed line 212 represents a plane between layers (not separately shown in FIGS. 7a and 7b) of read sensor 304.

It should also be noted that the geometric features shown in FIGS. 5a and 5b, 6a and 6b and 7a and 7b are only examples and other suitable geometric features may be utilized. The geometric features may be formed by any suitable currently know methods or suitable methods that may be developed in the future.

It should be noted that the terms "low" and "high" are used as relative terms in this disclosure. Thus, for example, a low permeability layer adjacent to a high permeability layer does not imply a particular permeability value or permeability range for the low and high permeability layers, but simply indicates that one layer has a lower permeability relative to the other layer. Further, in some applications, the embodiments shown in FIGS. 5a through 7c may utilize a same material for layers 418, 420, 422 and 424 and thus, in such embodiments, all these layers will have a same permeability value and, consequently, the flux paths in portions of the shields proximate to the reader will be influenced substantially only by the geometric features included in the shields.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above sections and/or arrangement of paragraphs are provided for ease of reading only and, for example, do not limit one or more aspects of the disclosure discussed in a particular section with respect to a particular example and/or embodiment from being combined with, applied to, and/or utilized in another particular example, and/or embodiment which is described in another section. Elements, features and other aspects of one or more examples may be combined and/or interchangeable with elements, features and other aspects of one or more other examples described herein.

The above-disclosed subject matter is to be considered illustrative, and not restrictive, and the appended and/or issued claims are intended to cover all such modifications, enhancements, and other embodiments, which fall within the true spirit and scope of the present invention. Thus, to the maximum extent allowed by law, the scope of the present invention is to be determined by the broadest permissible interpretation of the appended and/or issued claims and their equivalents, and shall not be restricted or limited by the foregoing detailed description.

What is claimed is:

1. An apparatus comprising:
a first read shield and a second read shield; and
a reader stack between the first and second read shields;
the first and second read shields each comprise a thin high permeability layer closest to the reader stack and a low permeability layer, wherein the thin high permeability layer in the first read shield and the thin high permeability layer in the second read shield are configured to control magnetic field flux lines in a free layer of the reader stack,
wherein, in each of the first and second read shields, a portion of the low permeability layer is substantially flush with a bearing surface, and
wherein a depth to which the thin high permeability layer in the first read shield extends from the bearing surface and a depth to which the thin high permeability layer in the second read shield extends from the bearing surface are each substantially greater than a depth to which the reader stack extends from the bearing surface.

2. The apparatus of claim 1 and further comprising a second high permeability layer in at least one of the first or second read shields.

3. The apparatus of claim 1 wherein the thin high permeability layer in the first read shield and the thin high permeability layer in the second read shield each comprise a material having a high saturation moment and low magnetostriction.

4. The apparatus of claim 1 wherein the thin high permeability layer in the first read shield and the thin high permeability layer in the second read shield each comprise an alloy of Cobalt (Co), Nickel (Ni) and Iron (Fe).

5. The apparatus of claim 4 wherein the alloy of Co, Ni and Fe comprises between 70 and 80 percent by weight Co, between 8 and 18 percent by weight Ni and between 7 and 17 percent by weight Fe.

6. The apparatus of claim 5 wherein the alloy of Co, Ni and Fe comprises 75 percent by weight Co, 13 percent by weight Ni and 12 percent by weight Fe.

7. The apparatus of claim 1 wherein a thickness of the thin high permeability layer in the first read shield is about 40 nanometers and a thickness of the thin high permeability layer in the second read shield is about 40 nanometers.

8. An apparatus comprising:
a first read shield and a second read shield;
a reader stack between the first and second read shields;
the first and second read shields each comprise a geometric feature at a bearing surface configured to control magnetic field flux lines in a free layer of the reader stack, wherein the geometric features in the first and second read shields each include a sloping surface that is inclined with respect to a plane between layers of the reader stack.

9. The apparatus of claim 8 wherein the geometric feature comprises a recess in each of the first and second read shields.

10. The apparatus of claim 8 wherein the geometric feature is a partial gap between a high permeability layer and low permeability layer in each of the first and second read shields at the bearing surface.

11. The apparatus of claim 8 wherein the geometric feature comprises a notch near the reader stack in each of the first and the second read shields.

12. An apparatus comprising:
a first read shield and a second read shield; and
a reader stack between the first and second read shields;
the first and second read shields each comprise a thin high permeability layer and a low permeability layer, the first and second read shields each further comprise a geometric feature at a bearing surface configured to control magnetic field flux lines in a free layer of the reader stack, wherein the geometric features in the first and second read shields each include a sloping surface that is inclined with respect to a plane between layers of the reader stack, and
wherein, in each of the first and second read shields, a portion of the thin high permeability layer is substantially flush with a bearing surface.

13. The apparatus of claim 12 and further comprising a second high permeability layer in at least one of the first or second read shields.

14. The apparatus of claim 12 wherein the thin high permeability layer in the first read shield and the thin high permeability layer in the second read shield each comprise a material having a high saturation moment and low magnetostriction.

15. The apparatus of claim 12 wherein the thin high permeability layer in the first read shield and the thin high permeability layer in the second read shield each comprise an alloy of Cobalt (Co), Nickel (Ni) and Iron (Fe).

16. The apparatus of claim 15 wherein the alloy of Co, Ni and Fe comprises between 70 and 80 percent by weight Co, between 8 and 18 percent by weight Ni and between 7 and 17 percent by weight Fe.

17. The apparatus of claim 16 wherein the alloy of Co, Ni and Fe comprises 75 percent by weight Co, 13 percent by weight Ni and 12 percent by weight Fe.

18. The apparatus of claim 12 wherein the geometric feature comprises a recess in each of the first and second read shields.

19. The apparatus of claim 12 wherein the geometric feature is a partial gap between the high permeability layer and low permeability layer in each of the first and second read shields at the bearing surface.

20. An apparatus comprising:
a bearing surface;
a first read shield and a second read shield; and
a reader stack between the first and second read shields;
the first and second read shields each comprising a geometric feature at the bearing surface configured to control magnetic field flux lines in a free layer of the reader stack, wherein the geometric feature comprises a partial gap between a high permeability layer and a low permeability layer in each of the first and second read shields at the bearing surface.

21. An apparatus comprising:
a first read shield and a second read shield; and
a reader stack between the first and second read shields;
the first and second read shields each comprise a thin high permeability layer closest to the reader stack and a low permeability layer, wherein the thin high permeability layer in the first read shield and the thin high permeability layer in the second read shield are configured to control magnetic field flux lines in a free layer of the reader stack,
wherein, in each of the first and second read shields, a portion of the low permeability layer is substantially flush with a bearing surface, and
wherein the thin high permeability layer in the first read shield and the thin high permeability layer in the second read shield each comprise an alloy of Cobalt (Co), Nickel (Ni) and Iron (Fe).

* * * * *